(12) United States Patent
Zhang et al.

(10) Patent No.: US 11,716,258 B2
(45) Date of Patent: Aug. 1, 2023

(54) EARLY WARNING SYSTEM OF HANDSET-CAUSED MOBILE NETWORK PERFORMANCE DEGREDATION

(71) Applicant: T-Mobile USA, Inc., Bellevue, WA (US)

(72) Inventors: Xiao Zhang, Issaquah, WA (US); Ajay Meenkumar, Bellevue, WA (US); Prem Kumar Bodiga, Bothell, WA (US); Hermie Padua, Bellevue, WA (US); Sang Yoon Yang, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 482 days.

(21) Appl. No.: 17/026,014

(22) Filed: Sep. 18, 2020

(65) Prior Publication Data

US 2022/0094612 A1    Mar. 24, 2022

(51) Int. Cl.

| | |
|---|---|
| *H04L 41/50* | (2022.01) |
| *H04L 41/5025* | (2022.01) |
| *H04L 43/045* | (2022.01) |
| *H04L 43/00* | (2022.01) |
| *H04W 24/10* | (2009.01) |
| *H04L 41/40* | (2022.01) |
| *H04L 43/08* | (2022.01) |
| *H04L 43/20* | (2022.01) |
| *H04L 41/14* | (2022.01) |

(52) U.S. Cl.
CPC ...... *H04L 41/5032* (2013.01); *H04L 41/5025* (2013.01); *H04L 43/045* (2013.01); *H04L 43/14* (2013.01); *H04W 24/10* (2013.01)

(58) Field of Classification Search
CPC ... H04L 41/5032; H04L 43/045; H04L 43/14; H04L 41/40; H04L 43/08; H04L 43/20; H04L 41/145; H04W 24/10
See application file for complete search history.

(56) References Cited

U.S. PATENT DOCUMENTS

| | | | | |
|---|---|---|---|---|
| 11,516,100 | B1 * | 11/2022 | Zheng | H04L 43/50 |
| 2016/0224453 | A1 * | 8/2016 | Wang | G06F 8/71 |
| 2017/0310546 | A1 * | 10/2017 | Nair | H04L 41/0654 |
| 2018/0121322 | A1 * | 5/2018 | Reyes | G06F 11/3616 |

* cited by examiner

*Primary Examiner* — Asghar H Bilgrami
(74) *Attorney, Agent, or Firm* — Han Santos, PLLC

(57) ABSTRACT

A network performance degradation detection system is provided. The system receives Key Performance Indicator (KPI) values for devices of different device types running different software versions. The system determines baseline values of a first device type by averaging the KPI values of the different software versions running on devices of the first device type. The system compares KPI values for a first software version running on devices of the first device type with the determined baseline values to produce a set of comparison results. The system applies the set of comparison results to a classification model to determine whether the first software version running on devices of the first device type causes network performance degradation.

20 Claims, 9 Drawing Sheets

| Vendor | Device | Software Version | Launch period | Device Count | Severity of Performance Degradation ||||
|---|---|---|---|---|---|---|---|---|
| | | | | | VoLTE DCR | WiFi DCR | LTE Leakage | L** RSRP |
| SM | SM-G981U1 | SE_X1 | 2020-Q1 | 11.3K | Low | High | Low | None |
| OP | HD-1925 | 5G_Chew | 2019-Q4 | 38.0K | None | Low | None | Medium |
| SM | SM-G986U1 | SE_Y2 | 2020-Q1 | 9.0K | None | None | High | None |
| SM | SM-G986U1 | 5G_Y2 | 2020-Q1 | 55.7K | Low | Low | None | Medium |
| SM | N976U1 | 5G_D2X | 2019-Q4 | 86.2K | None | Medium | Low | None |
| SM | N976U1 | 5G_D2X | 2019-Q4 | 86.2K | None | None | Low | Low |
| SM | SM-G977T | 5G_Beyond X | 2019-Q2 | 4.2K | None | None | None | None |
| SM | N976U1 | 5G_D2X_MPCS | 2019-Q4 | 2.0K | None | None | Low | None |
| SM | SM-G986U1 | SE_Y2 | 2020-Q1 | 9.0K | None | None | None | Low |
| SM | SM-G988U | 5G_Z3 | 2020-Q1 | 61.2K | None | None | None | Low |
| SM | SM-G988U | 5G_Z3 | 2020-Q1 | 61.2K | None | None | None | Low |
| SM | SM-G988U1 | SE_Z3 | 2020-Q1 | 14.8K | None | None | Low | None |
| SM | SM-G981U | 5G_X1 | 2020-Q1 | 83.7K | None | None | None | Low |
| SM | SM-G981U | 5G_X1 | 2020-Q1 | 83.7K | None | None | None | Low |
| SM | SM-G981U1 | SE_X1 | 2020-Q1 | 11.3K | None | None | None | Low |
| LG | LM-V600TM | 5G_Time | 2020-Q2 | 17.0K | None | None | Low | None |
| SM | SM-G986U | 5G_Y2 | 2020-Q1 | 55.7K | None | None | None | Low |

FIG. 6

EARLY WARNING SYSTEM OF HANDSET-CAUSED MOBILE NETWORK PERFORMANCE DEGREDATION

BACKGROUND

Wireless network performance is affected by numerous factors such as core network, backhaul network, radio network, cell sites, devices and so forth, which makes troubleshooting the cause of performance degradation difficult. Furthermore, a great number of software applications are released each year to be run on existing handsets, and such software releases on devices may cause performance degradation that negatively affects millions of users. Typically, investigations of performance degradation events may take days or even weeks to isolate and fix faults. Millions of users in the meantime endure low wireless network performance.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIG. 6 illustrates an example dashboard for the network performance degradation detection system.

DETAILED DESCRIPTION

This disclosure is directed to a network performance degradation detection system. The system provides early warning of network performance degradation in order to reduce the impact on the wireless network and its users. The system achieves timely and automated detection of handset-caused performance degradation through machine learning. The system processes Key Performance Indicators (KPIs) for hundreds of handsets of the wireless network to identify the handset(s) that caused the performance degradation. The system generates early warning of the performance degradation so that engineers may proactively fix relevant issues before customer experiences are negatively or significantly impacted.

Figure 1:
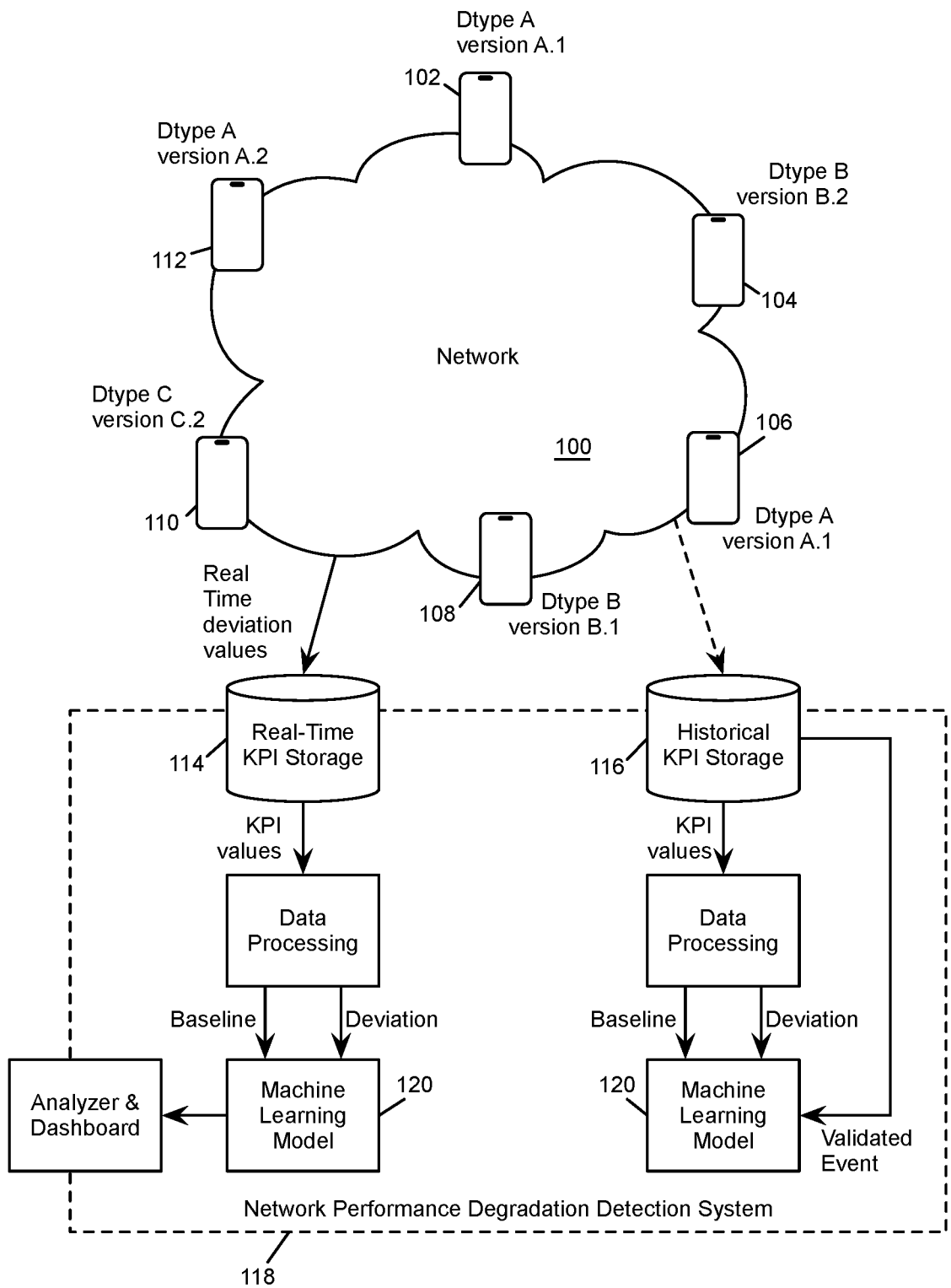
FIG. 1 shows a network that is being monitored for handset-caused performance degradation.

FIG. 1 shows a network 100 that is being monitored for handset-caused performance degradation. The network 100 is supported by a network infrastructure of a telecommunications service provider, which provides network access to various user devices. Each of the user devices may be a desktop computer, a laptop computer, a tablet computer, a smartphone, a smartwatch, a personal digital assistant (PDA), or any other computing device or mobile device that can communicate with other devices via the network 100. More specifically, the network 100 is equipped with radio access networks (RANs) and/or wireless local area networks (WLANs) that provide wireless connectivity to wireless user devices such as wireless handsets or smartphones.

The network infrastructure may include the core network of the telecommunications service provider. The network infrastructure may include routers, switches, or other types of data forwarding elements for conducting data traffic (e.g., packet traffic) between various network endpoints such as user devices, base stations, hotspots, and other types of computing resources. The core network also provides access to external networks such as the Internet. The core network may include components that provide services to the subscribers of the cellular network and track positions of the user devices. The core network may include a packet network, e.g., an Evolved Packet Core (EPC) that interconnects different components belonging to an Evolved Packet System (EPS). EPC is a framework for providing converged voice and data on a 4G LTE network. EPC unifies voice and data on an Internet Protocol (IP) service architecture. The EPC allows the operator of the cellular network 100 to deploy and operate one packet network for 2G, 3G, 4G, 5G, wireless local area network (WLAN), and fixed access such as Ethernet, DSL, cable, and fiber.

As illustrated, wireless handsets 102, 104, 106, 108, 110, and 112 are mobile devices that subscribe to the telecommunications service of the network 100. The wireless handsets may be physically located in different regions and markets. The wireless handsets may be of different device types produced by different vendors. In FIG. 1, handsets 102, 106, 112 are of device type "A", handsets 104 and 108 are of device type "B", and the handset 110 is of device type "C". The wireless handsets may also be running different software or different versions of the same software. In the figure, the handsets 102 and 106 are running software version "A.1", the handset 112 is running software version "A.2", the handset 108 is running software version "B.1", the handset 104 is running software version "B.2", etc.

The network 100 is configured to collect the data of various key performance indicators (KPI) in the network 100, which may be related to performance of the network 100 or the performance of individual handsets. The KPI data may be collected from handsets in different markets or geographical locations, with different vendors, technologies, device types, software versions, etc. KPI data may report different topics or features, such as drop call rates (DCR) of the devices, radio leakage measurements, etc. The collected KPI data are stored in a real-time KPI storage 114 and/or a historical KPI storage 116. In some embodiments, each set of KPI data has a set of metadata for associating the set of KPI data with features that characterize the KPIs or for identifying the sources from which the KPI data are collected.

A network performance degradation detection system 118 analyzes the KPI data stored in the real-time KPI storage 114 and/or the historical KPI storage 116 to determine whether network performance degradation in the network 100 has occurred. The historical KPI data stored in the historical KPI storage 116 may be used by the system to train a machine learning model 120 to detect network performance degradation from real-time KPI data.

In some embodiments, the system 118 is configured to detect performance issues that are related to software launches or user devices rather than the infrastructure of the network 100. For example, the system 118 may detect changes in device attributes that may cause the performance degradation. The system may also analyze performance data or mobile network KPIs in order to determine whether performance degradation has occurred. The system may focus on data points that occur after a software launch and determine whether the performance degradation is caused by the software launch. The system 118 may also account for the effects of seasonality and residual degradation (from previous events) in the KPI data.

In order to detect network performance degradation events that are caused by user devices or software versions, the network performance degradation detection system 118 uses KPI data of different device types and software versions at different time instances as sources of analysis. Specifically, historical KPI data and validated handset-caused performance degradation events are used to train the machine learning model 120, and once trained, the machine learning model 120 is used to recognize handset-caused performance degradation events from real-time KPI data.

In some embodiments, the system analyzes the KPI data for different device types and software versions by initially determining a baseline for each device type, regardless of the software versions. For a specified device type, the system may compare the baseline for that device type with the KPI data of the devices of the same device type running different software versions to determine whether any of the software versions causes the network performance degradation.

Figure 2:
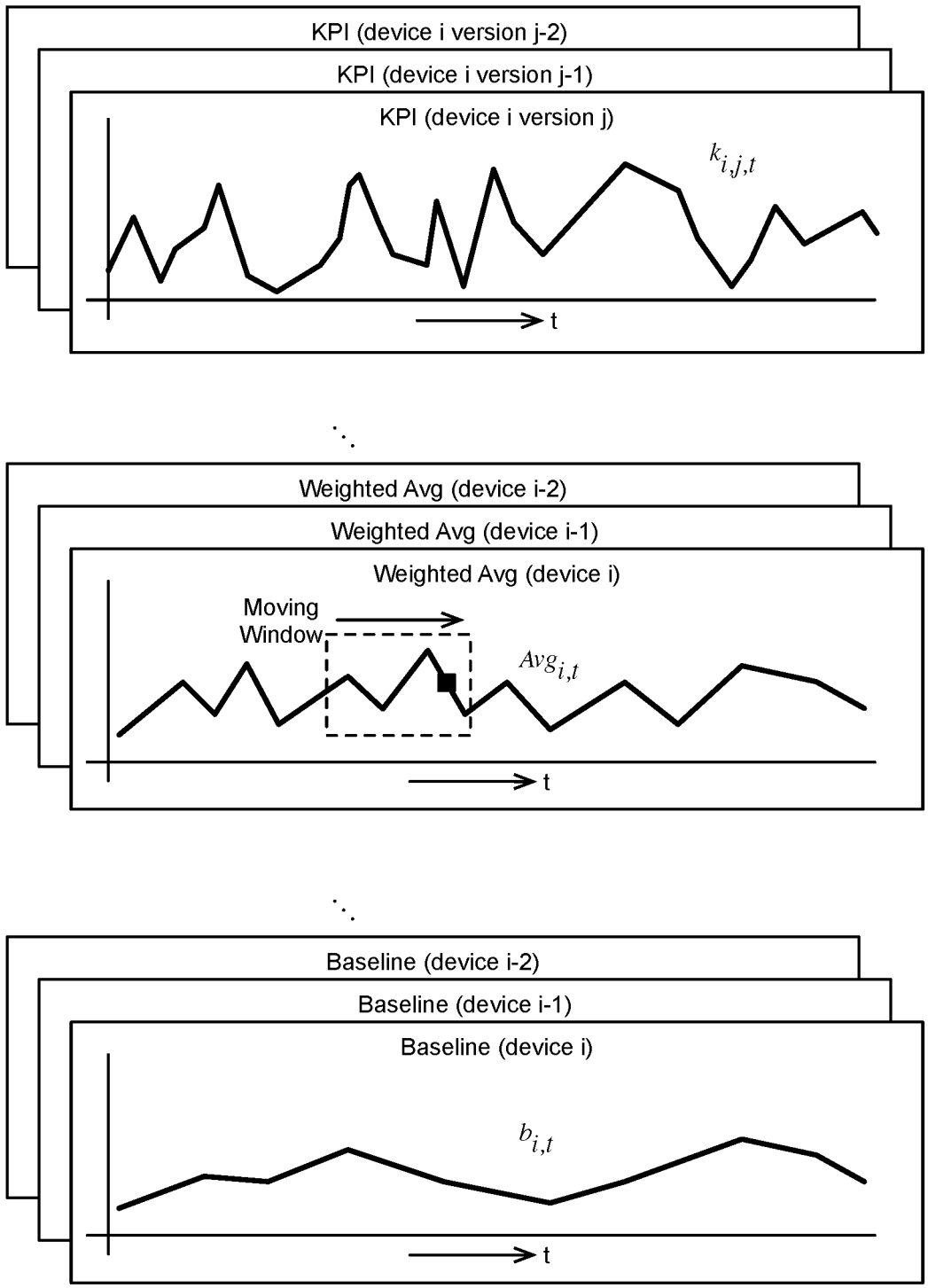
FIG. 2 conceptually illustrates Key Performance Indicator (KPI) data and corresponding baseline data that are derived from the KPI data.

FIG. 2 conceptually illustrates KPI data and corresponding baseline data that are derived from the KPI data. As illustrated, KPI data are collected from devices of different device types running different software versions ($k_{i,j,t}$ denotes KPI data of device i and software version j at time instance t) while baselines for each device type are computed from the KPI data for those device types ($b_{i,t}$ denotes baseline for device type i at time instance t.) The KPI values of the different software versions j running on a device of device type i are averaged as $avg_{i,t}$, and for each time instant t, a median average value is identified from a moving window to become the baseline value $b_{i,t}$. This serves to minimize the effect of seasonality from the baseline. In some embodiments, the system computes the baseline for different markets, vendors, or other types of levels. In these instances, for level "l", the KPI data is denoted as $k_{i,j,t,l}$, and the baseline is denoted as $b_{i,t,l}$.

Figure 3:
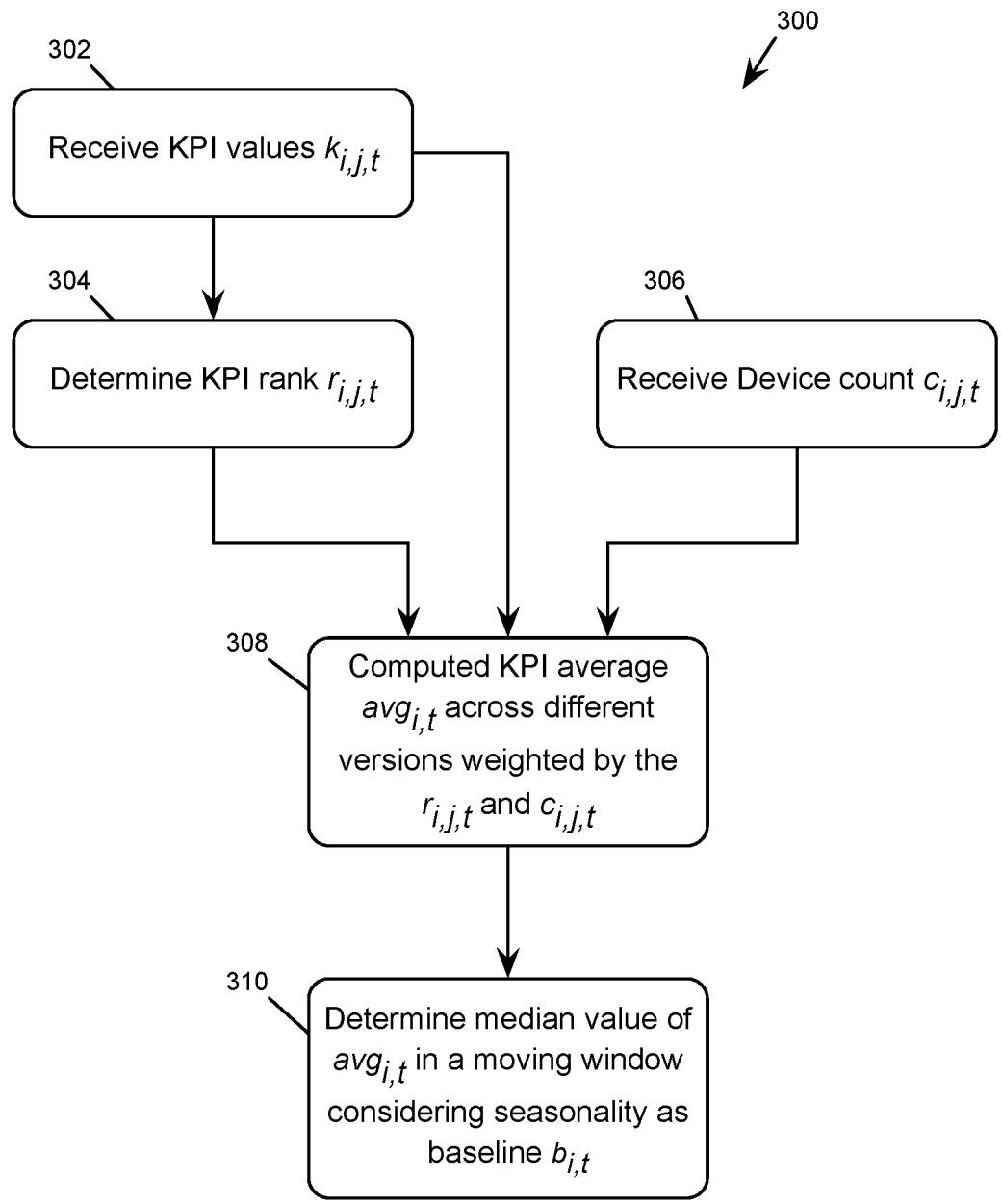
FIG. 3 conceptually illustrates a flow diagram of an example process 300 for deriving baseline values from KPI data.

FIG. 3 conceptually illustrates a flow diagram of an example process 300 for deriving baseline values from KPI data. Specifically, the process is used to compute baseline $b_{i,t}$ for device type i from KPI data $k_{i,j,t}$ of device type i for different possible software versions (different j's). In some embodiments, a computing device implementing the network performance degradation detection system 118 performs the process 300.

The process 300 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform particular functions or implement particular abstract data types. The order in which the operations are described is not intended to be construed as a limitation, and any number of the described blocks can be combined in any order and/or in parallel to implement the process.

At block 302, the system receives KPI values $k_{i,j,t}$ regarding devices of device type i that are running different software versions (different j values) at different time instances. At block 304, the system determines a rank $r_{i,j,t}$ for each device type and software version based on the KPI values such that combinations of device types and software-versions that result in lower performance measures are ranked lower than higher performing combinations of device types and software versions. At 306, the system receives device count $c_{i,j,t}$ for each device type i and software version j combination (i.e., the number devices that are of device type i and running software version j).

At 308, the system computes an average value $avg_{i,t}$ for each device type i that are averaged across different software versions running on device type i. The KPI values of each software version may be weighted based on the rank (computed in block 304) and the device count (computed in block 306) of that software version. At block 310, the system determines the median value of $avg_{i,t}$ in a moving window as baseline $b_{i,t}$. By using the baseline, the system can consider seasonality when analyzing the KPI data, e.g., to filter off or to discount or to account for the effect of seasonality such that periodic noise in the data will not affect the detection of network performance degradation.

Figure 4:
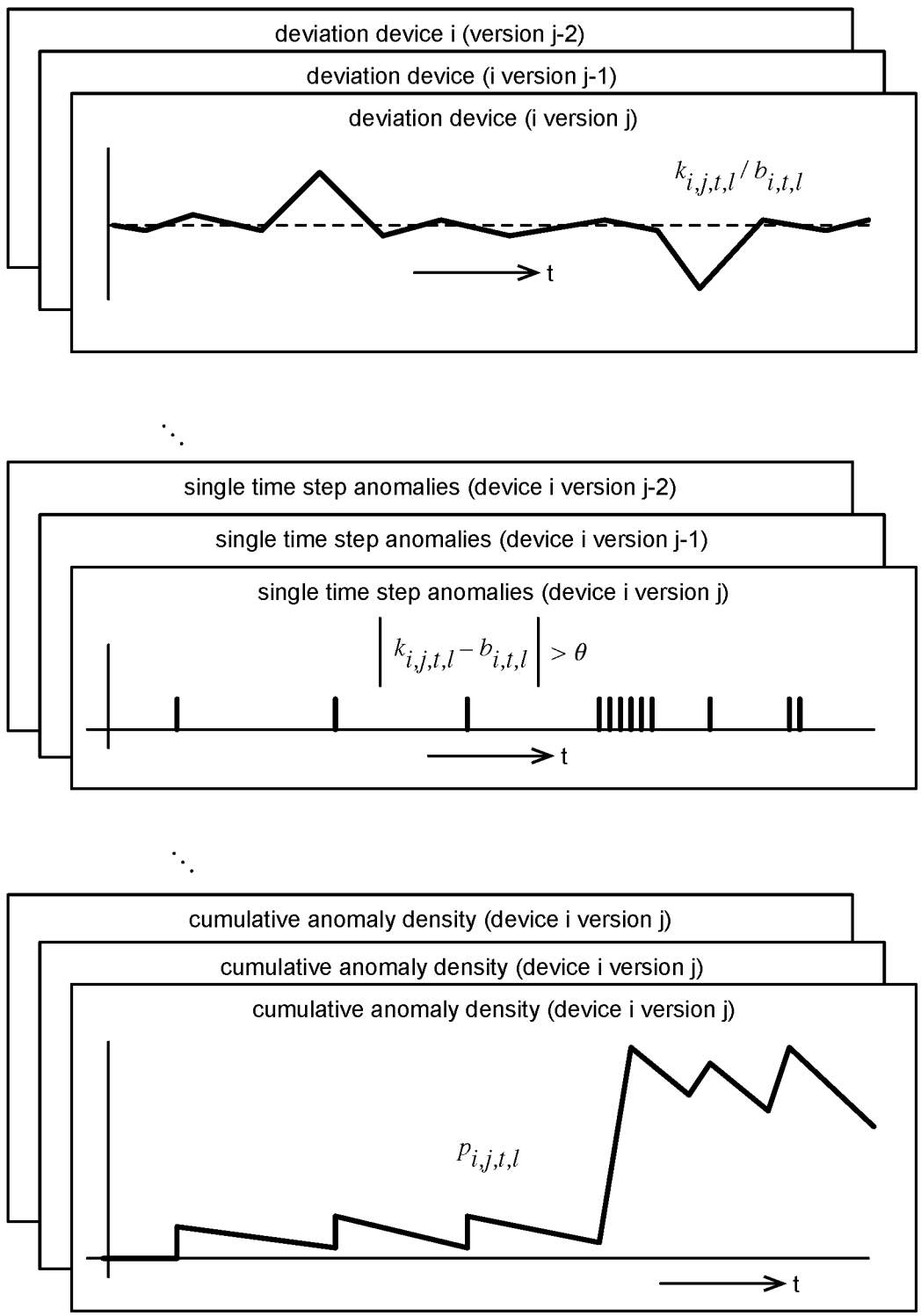
FIG. 4 illustrates deviation and cumulative anomaly percentages that are derived from baseline and KPI data.

In some embodiments, the system uses the computed baseline of a device type i to compute a cumulative anomaly percentage $p_{i,j,t,l}$ and a deviation $k_{i,j,t,l}/b_{i,t}$ for the KPI data $k_{i,j,t,l}$ of each software version j running on devices of the device type i at level l. The computed cumulative anomaly percentage and the deviation are then applied as input to the trained machine learning model 120 to detect network performance degradation. FIG. 4 illustrates deviation and cumulative anomaly percentage that are derived from baseline and KPI data.

As illustrated, for software version j running on devices of device type i, the deviation is denoted or computed as $k_{i,j,t}/b_{i,t}$ for time instance t, or denoted as $k_{i,j,t,l}/b_{i,t,l}$ for level "l". (Thus, a deviation value of 1.0 at a time instant indicates that KPI data has no deviation from the baseline at that time instant.)

For software version j running on devices of device type i, the cumulative anomaly percentage $p_{i,j,t,l}$ is computed by accumulating single time step anomalies from the launch date of the software version j. The system performs single time step anomaly judgements by comparing KPI values and the corresponding baseline values. For example, for each time instant t, the single time step anomaly is defined as '1' when the difference between the KPI value and the corresponding baseline is greater than or equal to a threshold, and '0' when the difference is smaller than the threshold. The cumulative anomaly percentage $p_{i,j,t,l}$ for the software version j running on device type i at time instant t is then computed as the sum of the single time step anomalies divided by the time period between the launch of the software version and time instant t.

Figure 5:
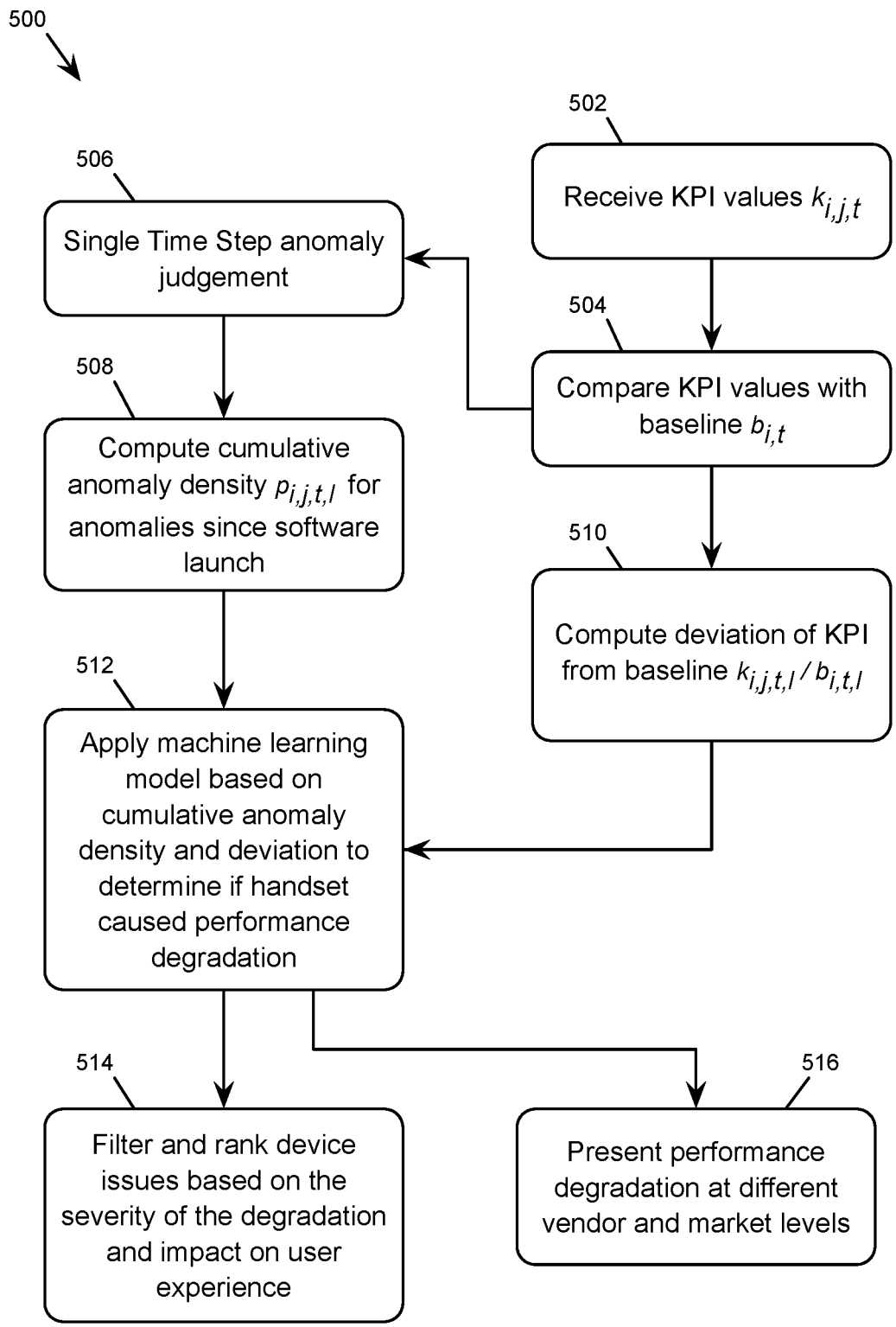
FIG. 5 conceptually illustrates a process for using baseline to analyze KPI data and detect network performance degradation.

FIG. 5 conceptually illustrates a process 500 for using a baseline to analyze KPI data and detect network performance degradation. Specifically, the process 500 is used to compute the deviation $k_{i,j,t,l}/b_{i,t,l}$ and the cumulative anomaly percentage $p_{i,j,t,l}$ based on real-time KPI data for software version j running on devices of device type i for level l. The deviation and the cumulative anomaly percentage are then used as machine learning input to detect network performance degradation. In some embodiments, a computing device implementing the network performance degradation detection system 118 performs the process 500.

The process 500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform particular functions or implement particular abstract data types. The order in which the operations are described is not intended to be construed as a limitation, and any number of the described blocks can be combined in any order and/or in parallel to implement the process.

At block 502, the system receives KPI data or KPI values for software version j running on devices of device type i for level l ($k_{i,j,t}$). The KPI data may include real-time KPI values that are collected from the network 100.

At block 504, the system compares the KPI values with baseline $b_{i,t}$ computed for device type i by averaging KPI values of different software versions. In some embodiments, the system generates the baseline values by performing the process 300 based on the KPI data received at block 502. In some embodiments, the system receives the baseline values $b_{i,t}$ that are computed earlier for device type i.

At block 506, the system performs single time step anomaly judgement for software version j running on devices of device type i for level l. At block 508, the block computes cumulative anomaly percentage $p_{i,j,t,l}$ for each time instant t since the launch of the software version j by dividing the sum of the single time step anomalies by the time period between the launch of the software version j and the time instant t.

At block 510, the system computes the deviation $k_{i,j,t,l}/b_{i,t,l}$ of KPI data from the baseline for software version j running on devices of device type i for level l.

At block 512, the system applies a machine learning model by using the cumulative anomaly percentage (computed in block 508) and the deviation (computed in block 510) as input. The output of the machine learning model indicates whether the combination of cumulative anomaly percentage and deviation for any software version running on any device type is likely the cause of network performance degradation. The training of the machine learning model will be described by reference to FIG. 7 below.

At block 514 the system filters and rank device issues based on the severity of the performance degradation and the impact on user experience. At block 516, the system presents (e.g., displays) performance degradation metrics at different vendor and market levels. In some embodiments, the system provides a platform in which software versions that are identified as the cause of performance degradation can be automatically reported. The system may classify network performance degradation faults into those related to software launch (1) or not (0). The system may also explore vendor and market level data to pinpoint the location or entity that is most affected by the performance degradation. The system may provide a dashboard to show which handsets and software versions have degradation issues with which KPIs. Each handset and/or software version has an indication (e.g., color-coded) for the severity of the detected issue.

FIG. 6 illustrates an example dashboard 600 for the network performance degradation detection system. In some embodiments, the dashboard may show issues specific to 5G devices.

Figure 7:
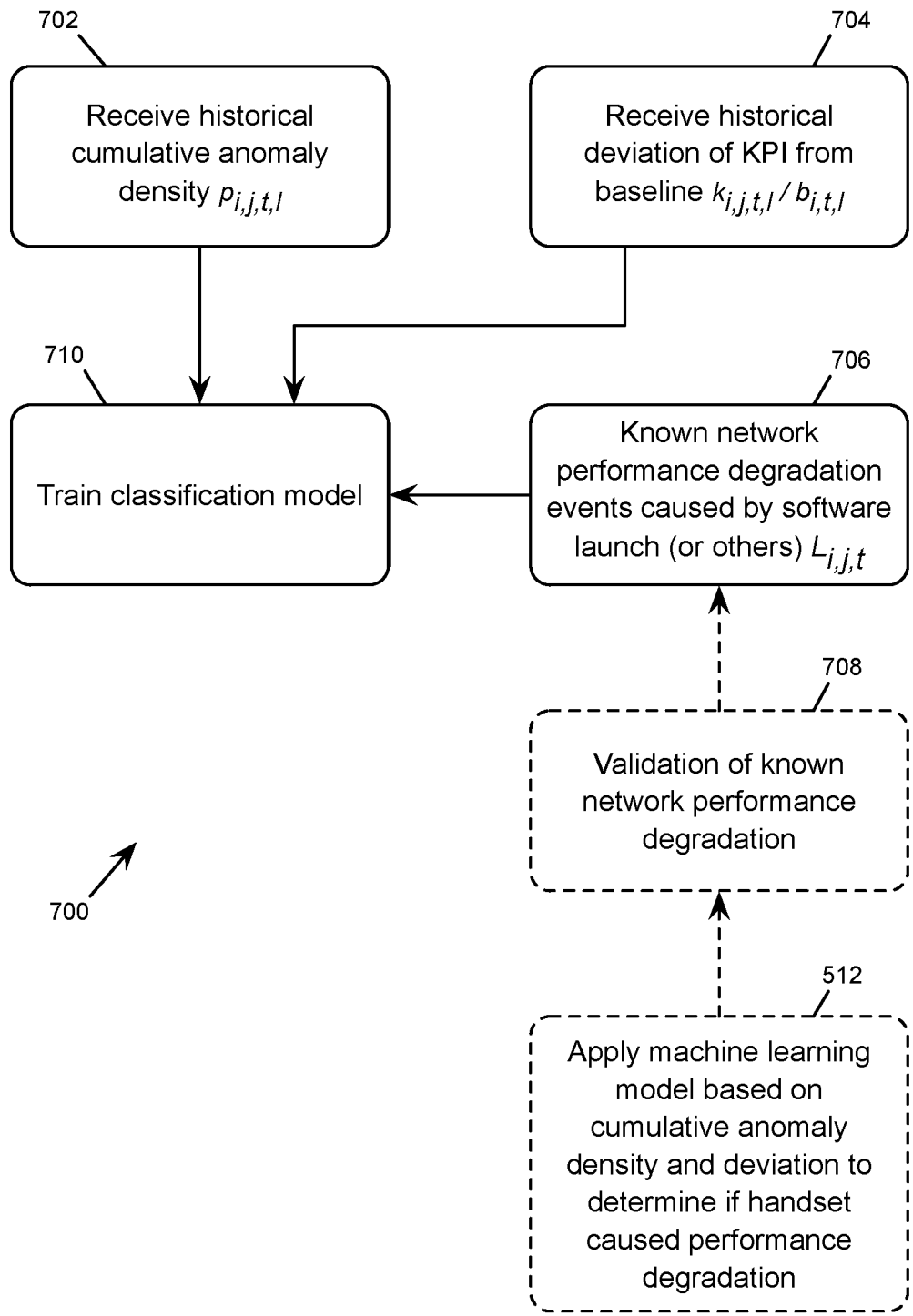
FIG. 7 conceptually illustrates a process for training a machine learning model that can be used to detect network performance degradation.

FIG. 7 conceptually illustrates a process 700 for training a machine learning model that can be used to detect network performance degradation. In some embodiments, a computing device implementing the network performance degradation detection system 118 performs the process 700. Specifically, the process 700 is used to train a machine model to use cumulative anomaly percentages and deviations from baselines to detect network performance degradation events caused by software version launches.

The process 700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform functions or implement abstract data types. The order in which the operations are described is not intended to be construed as a limitation, and any number of the described blocks can be combined in any order and/or in parallel to implement the process.

At block 702, the system receives historical cumulative anomaly percentage $p_{i,j,t,l}$. This historical cumulative anomaly percentage is computed based on historical KPI data of different software versions running on different device types. At block 704, the system receives historical deviation of KPI from baseline $k_{i,j,t,l}/b_{i,t,l}$ (that are derived from the same KPI data as the historical cumulative anomaly percentage).

At block 706, the system receives known network performance degradation events caused by software launches. These known degradation events are used as labels $L_{i,j,t}$ to label the corresponding historical cumulative anomaly percentages (received at block 702) and historical deviations (received at block 704) as training sets of the machine learning model. In some embodiments, the known network performance degradation events are events detected by previous execution of the network performance degradation detection system 118 (at block 512) and validated by an engineer or administrator (at block 708).

At block 710, the system uses the received historical cumulative anomaly percentage $p_{i,j,t,l}$, the received historical deviation of KPI from baseline $k_{i,j,t,l}/b_{i,t,l}$, and the labels $L_{i,j,t}$ to train the classification model to recognize degradation event that are caused by launches of software versions.

Example Computing Device

Figure 8:
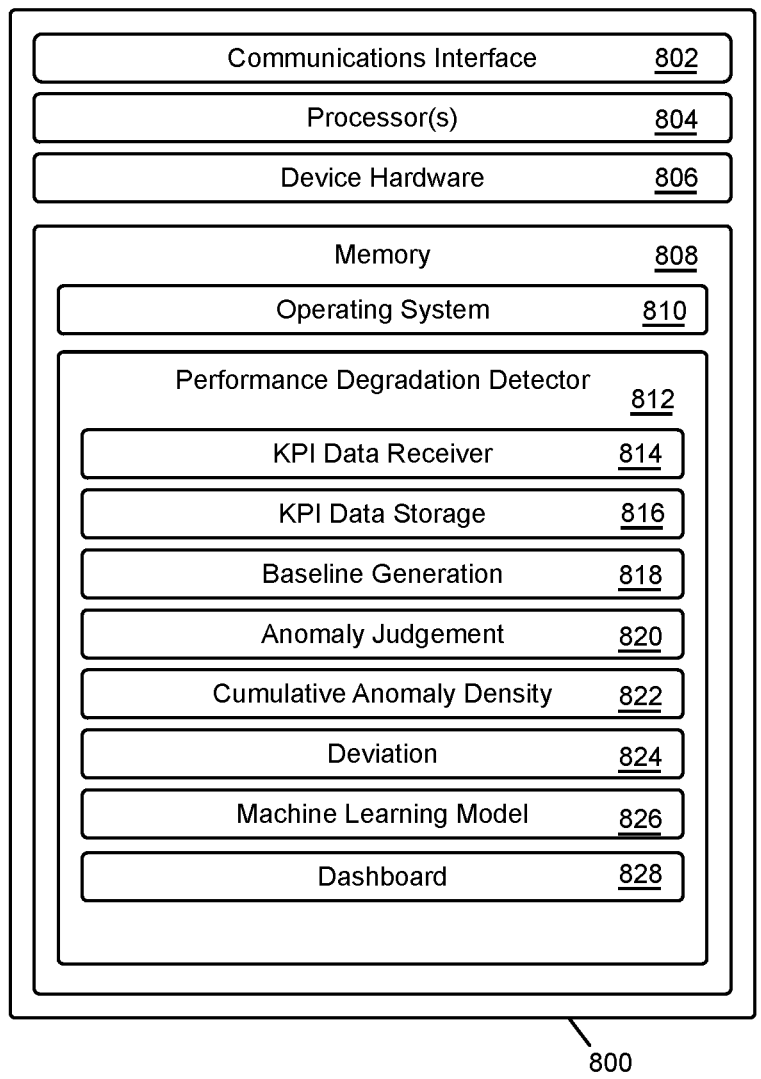
FIG. 8 is a block diagram showing various components of an example network performance degradation detection system.

FIG. 8 is a block diagram showing various components of an example network performance degradation detection system, consistent with an embodiment of the disclosure. The network performance degradation detection system uses a machine learning model to detect network performance degradation events in a telecommunications network that are caused by handsets, specifically due to launches of new software versions.

FIG. 8 illustrates a computing device 800 implementing the network performance degradation detection system 118. In some embodiments, the computing device is a set of hardware devices that are configured by specialized software for network performance degradation detection.

The computing device 800 may be a general-purpose computer, such as a desktop computer, tablet computer, laptop computer, server, or an electronic device that can receive inputs, processing the inputs, and generating output data. The computing device 800 may also be a virtual computing device such as a virtual machine or a software container that is hosted in a cloud. Alternatively, the computing device 800 may be substituted with multiple computing devices, virtual machines, software containers, and/or so forth.

The computing device 800 may be equipped with one or more of the following: a communications interface 802, one or more processors 804, device hardware 806, and memory 808. The communications interface 802 may include wireless and/or wired communication components that enable the computing devices to transmit data to and receive data from other devices. The data may be relayed through a dedicated wired connection or via a communications network. The device hardware 806 may include additional hardware that performs user interface, data display, data communication, data storage, and/or other server functions.

The memory 808 may be implemented using computer-readable media, such as a computer-readable storage medium. Computer-readable storage media include, at least, two types of computer-readable media, namely computer-readable storage media and communications media. Computer-readable storage media may include volatile and non-volatile, removable and non-removable media implemented in any method or technology for storage of information such as computer-readable instructions, data structures, program modules, or other data. Computer storage media may include, but is not limited to, random-access memory (RAM), read-only memory (ROM), electrically erasable programmable ROM (EEPROM) flash memory or other memory technology, compact-disc-ROM (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable storage media do not consist of, and are not formed exclusively by, modulated data signals, such as a carrier wave. In contrast, communication media may embody computer-readable instructions, data structures, program modules, or other data in a modulated data signal, such as a carrier wave, or other transmission mechanisms.

The processors 804 and the memory 808 of the computing device 800 may implement an operating system 810 and a performance degradation detector 812. The performance degradation detector 812 includes a KPI data receiver 814, a KPI data storage 816, a baseline generation module 818, an anomaly judgement module 820, a cumulative anomaly percentage module 822, a deviation module 824, a machine learning model 826, and a dashboard module 828. The various software may include routines, program instructions, objects, and/or data structures that are executed by the processors 804 to perform tasks or implement abstract data types.

The operating system 810 may include components that enable the computing devices 800 to receive and transmit data via various interfaces (e.g., user controls, communications interface, and/or memory input/output devices), as well as process data using the processors 804 to generate output. The operating system 810 may include a presentation component that presents the output (e.g., display the data on an electronic display, store the data in memory, transmit the data to another electronic device, etc.). The operating system 810 may include a hypervisor that allows the computing device to operate one or more virtual machines and/or virtual network components. Additionally, the operating system 810 may include other components that perform various additional functions generally associated with an operating system.

The performance degradation detector 812 is a program that configures the computing device 800 to detect or predict network performance degradation based on real-time or historical KPI data. The KPI data receiver 814 is a software component that directs the communications interface 802 to retrieve KPI data from the network 100. The KPI data may be retrieved from servers that store subscriber information (e.g., device types and software versions) and performance information (e.g., drop call rates). The KPI data storage 816 refers to memory storage allocated to implementing a database for storing KPI time series data associated with different device types and software versions. The KPI data storage may also be used to store intermediate data such as baseline values, cumulative anomaly percentages, deviations, etc.

The baseline generation module 818 is a software component that computes baselines for different device types by averaging KPI values of different software versions running on those device types. The baseline generation module 818 may weight the KPI values of each software version by its rank and device count. The baseline generation module 818 may minimize the effect of seasonality by taking the median values in moving windows of average values as the values of the baseline.

The anomaly judgement module 820 is a software component that performs single time step anomaly judgement by comparing values of KPI data with corresponding baseline values. For example, the single time step anomaly is defined as '1' when the difference between a KPI value at a time step and the corresponding baseline value is greater than or equal to a threshold, and '0' when the difference is smaller than the threshold. The cumulative anomaly percentage module 822 is a software component that computes the cumulative anomaly percentage for a software version running on devices of a device type by accumulating the single time step anomalies from the launch date of the software version.

The deviation module 824 is a software component that computes the deviation of the KPI data, specifically by computing a ratio between the KPI values of a software version running on a type of device with the baseline values of that type of device.

The machine learning model 826 is a software component that is trained to detect likely network performance degradation events, specifically by using cumulative anomaly percentages and deviations of software versions as inputs to detect handset-caused performance degradation events. In some embodiments, the machine learning model 826 is a classifier that is implemented based on a neural network. In some embodiments, the machine learning model 826 can be trained based on historical KPI data.

The dashboard module 828 is a software module that presents (e.g., displays at a display device) the result of the network performance degradation detection based on the output of the machine learning model 826. In some embodiments, the dashboard indicates the severity of network degradation for each of various device types and software versions. The dashboard may also allow exploration of detected network degradation for different vendors and markets.

Figure 9:
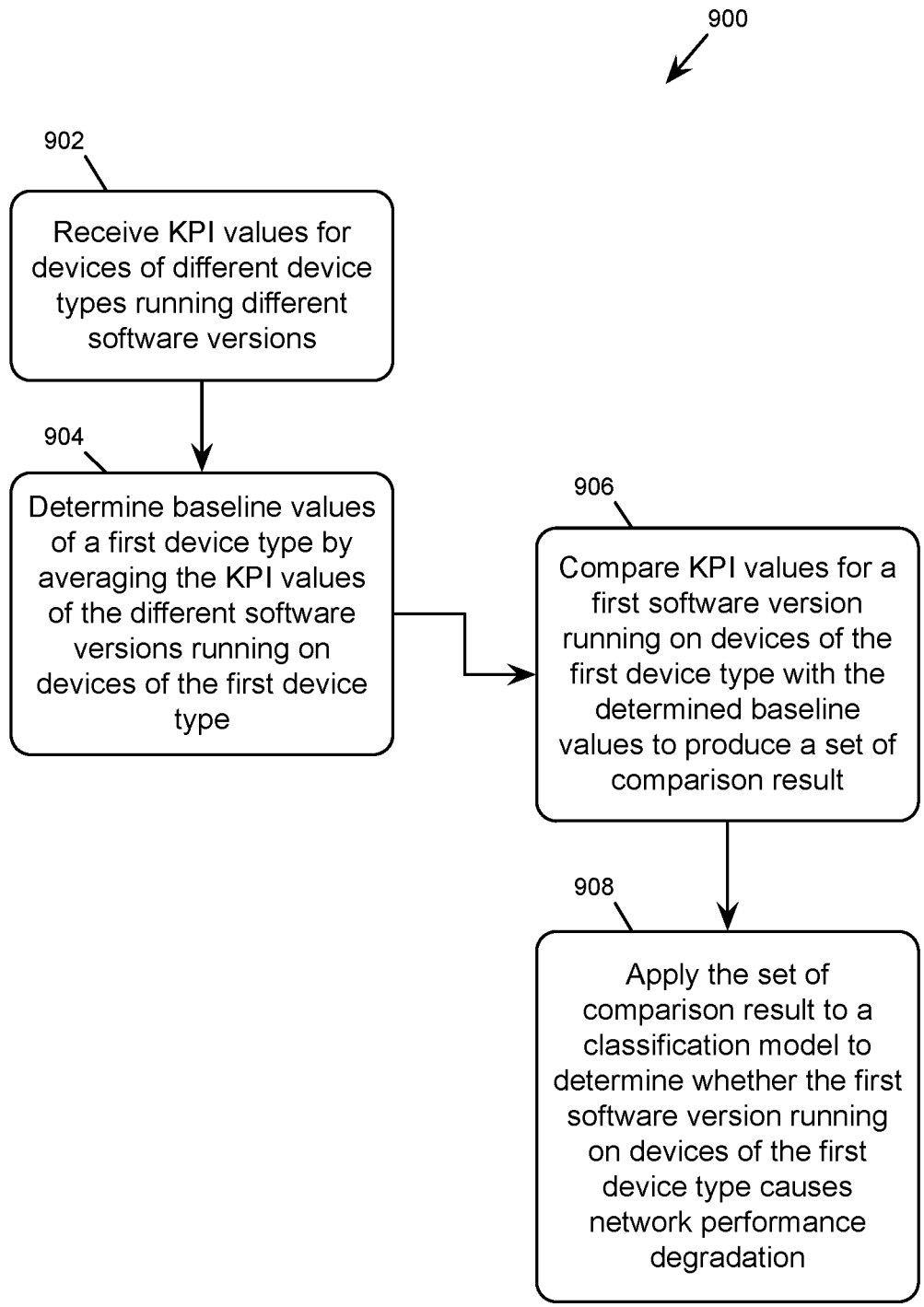
FIG. 9 conceptually illustrates a flow diagram of an example process performed by the network performance degradation detection system.

FIG. 9 conceptually illustrates a flow diagram of an example process 900 performed by the network performance degradation detection system 118. The process 900 is illustrated as a collection of blocks in a logical flow chart, which represents a sequence of operations that can be implemented in hardware, software, or a combination thereof (e.g., the computing device 800). In the context of software, the blocks represent computer-executable instructions that, when executed by one or more processors, perform the recited operations. Generally, computer-executable instructions may include routines, programs, objects, components, data structures, and the like, that perform functions or implement abstract data types. The order in which the operations are described is not intended to be construed as a limitation, and any number of the described blocks can be combined in any order and/or in parallel to implement the process.

At block 902, the system receives Key Performance Indicator (KPI) values for devices of different device types running different software versions. At block 904, the system determines baseline values of a first device type by averaging the KPI values of the different software versions running on devices of the first device type. In some embodiments, a baseline value is a median value in a moving temporal window that includes average KPI values of the different software versions running on devices of the first device type that are sampled at multiple time instances. In some embodiments, the system computes the average of the KPI values of the different software versions running on devices of the first device type by weighting the KPI values of the different software versions based on a rank and a device count of each software version.

At block 906, the system compares KPI values for a first software version running on devices of the first device type with the determined baseline values to produce a set of comparison results. In some embodiments, the set of comparison results include a cumulative anomaly percentage for the first software version that is determined by accumulating single time step anomalies from the launch date of the first software version (and divided over time period since the launch time). Each single time step anomaly is determined by comparing a KPI value of the first software version running on a device of a first device type with a corresponding baseline value of the first device type. In some embodiments, the set of comparison results also include a deviation for the first software version that is determined as a ratio between a KPI value of the first software version running on a device of a first device type and a corresponding baseline value for the first device type.

At block 908, the system applies the set of comparison results to a classification model as input to determine whether the first software version running on devices of the first device type causes network performance degradation. In some embodiments, the classification model is trained by using historical cumulative anomaly percentages and historical deviation values for different device types and different software versions and by labeling historical KPI values with known historical network performance degradation events that correspond to launches of software versions.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable storage media of a computing device storing computer-executable instructions that upon execution cause one or more processors to perform acts comprising:
   receiving Key Performance Indicator (KPI) values for devices of different device types running different software versions;
   determining baseline values of a first device type by averaging the KPI values of the different software versions running on devices of the first device type;
   comparing KPI values for a first software version running on devices of the first device type with the determined baseline values to produce a set of comparison results; and
   applying the set of comparison results to a classification model to determine whether the first software version running on devices of the first device type causes network performance degradation.

2. The one or more non-transitory computer-readable storage media of claim 1, wherein a baseline value is a median value in a moving temporal window that includes average KPI values of the different software versions running on devices of the first device type that are sampled at multiple time instances.

3. The one or more non-transitory computer-readable storage media of claim 1, wherein averaging KPI values of the different software versions running on devices of the first device type comprises weighting the KPI values of the different software versions based on a rank and a device count of each software version.

4. The one or more non-transitory computer-readable storage media of claim 1, wherein the set of comparison results comprises a cumulative anomaly percentage for the first software version that is determined by accumulating single time step anomalies from a launch date of the first software version, wherein each single time step anomaly is determined by comparing a KPI value of the first software version running on a device of a first device type with a corresponding baseline value of the first device type.

5. The one or more non-transitory computer-readable storage media of claim 4, wherein the set of comparison results further comprises a deviation for the first software version that is determined as a ratio between a KPI values of the first software version running on a device of a first device type and a corresponding baseline value for the first device type.

6. The one or more non-transitory computer-readable storage media of claim 5, wherein the classification model is trained by using historical cumulative anomaly percentage and historical deviation values for different device types and different software versions.

7. A computing device comprising:
   one or more processors; and
   a computer-readable storage medium storing a plurality of computer-executable components that are executable by the one or more processors to perform a plurality of actions, the plurality of actions comprising:
   receiving Key Performance Indicator (KPI) values for devices of different device types running different software versions;
   determining baseline values of a first device type by averaging the KPI values of the different software versions running on devices of the first device type;
   comparing KPI values for a first software version running on devices of the first device type with the determined baseline values to produce a set of comparison results; and
   applying the set of comparison results to a classification model to determine whether the first software version running on devices of the first device type causes network performance degradation.

8. The computing device of claim 7, wherein a baseline value is a median value in a moving temporal window that includes average KPI values of the different software versions running on devices of the first device type that are sampled at multiple time instances.

9. The computing device of claim 7, wherein averaging KPI values of the different software versions running on devices of the first device type comprises weighting the KPI values of the different software versions based on a rank and a device count of each software version.

10. The computing device of claim 7, wherein the set of comparison results comprises a cumulative anomaly percentage for the first software version that is determined by accumulating single time step anomalies from a launch date of the first software version, wherein each single time step anomaly is determined by comparing a KPI value of the first software version running on a device of a first device type with a corresponding baseline value of the first device type.

11. The computing device of claim 10, wherein the set of comparison results further comprises a deviation for the first software version that is determined as a ratio between a KPI values of the first software version running on a device of a first device type and a corresponding baseline value for the first device type.

12. The computing device of claim 11, wherein the classification model is trained by using historical cumulative anomaly percentage and historical deviation values for different device types and different software versions.

13. The computing device of claim 7, wherein the classification model is trained by labeling historical KPI values with known historical network performance degradation events that correspond to launches of software versions.

14. A computer-implemented method, comprising:
receiving, at a computing device, Key Performance Indicator (KPI) values for devices of different device types running different software versions;
determining baseline values of a first device type by averaging the KPI values of the different software versions running on devices of the first device type;
comparing KPI values for a first software version running on devices of the first device type with the determined baseline values to produce a set of comparison results; and
applying the set of comparison results to a classification model to determine whether the first software version running on devices of the first device type causes network performance degradation.

15. The computer-implemented method of claim 14, wherein a baseline value is a median value in a moving temporal window that includes average KPI values of the different software versions running on devices of the first device type that are sampled at multiple time instances.

16. The computer-implemented method of claim 14, wherein averaging KPI values of the different software versions running on devices of the first device type comprises weighting the KPI values of the different software versions based on a rank and a device count of each software version.

17. The computer-implemented method of claim 14, wherein the set of comparison results comprises a cumulative anomaly percentage for the first software version that is determined by accumulating single time step anomalies from a launch date of the first software version, wherein each single time step anomaly is determined by comparing a KPI value of the first software version running on a device of a first device type with a corresponding baseline value of the first device type.

18. The computer-implemented method of claim 17, wherein the set of comparison results further comprises a deviation for the first software version that is determined as a ratio between a KPI values of the first software version running on a device of a first device type and a corresponding baseline value for the first device type.

19. The computer-implemented method of claim 18, wherein the classification model is trained by using historical cumulative anomaly percentage and historical deviation values for different device types and different software versions.

20. The computer-implemented method of claim 14, wherein the classification model is trained by labeling historical KPI values with known historical network performance degradation events that correspond to launches of software versions.

* * * * *